United States Patent
Bernhardt et al.

(10) Patent No.: US 11,073,245 B2
(45) Date of Patent: Jul. 27, 2021

(54) METHOD AND INSTALLATION FOR STORING AND DISPENSING LIQUEFIED HYDROGEN

(71) Applicant: L'Air Liquide, Societe Anonyme pour l'Etude et l'Exploitation des Procedes Georges Claude, Paris (FR)

(72) Inventors: Jean-Marc Bernhardt, La Buisse (FR); Francois Lagoutte, Saint-Egreve (FR)

(73) Assignee: L'Air Liquide Societe Anonyme Pour L'Etude Et L'Exploitation Des Procedes Georges Claude, Paris (FR)

(*) Notice: Subject to any disclaimer, the term of this patent is extended or adjusted under 35 U.S.C. 154(b) by 72 days.

(21) Appl. No.: 16/681,167

(22) Filed: Nov. 12, 2019

(65) Prior Publication Data

US 2020/0149684 A1    May 14, 2020

(30) Foreign Application Priority Data

Nov. 12, 2018  (FR) ...................................... 1860429

(51) Int. Cl.
*F17C 13/04* (2006.01)
*F17C 13/00* (2006.01)

(52) U.S. Cl.
CPC ............ *F17C 13/04* (2013.01); *F17C 13/002* (2013.01); *F17C 2221/012* (2013.01);
(Continued)

(58) Field of Classification Search
CPC ......... Y02E 60/32; Y02P 90/45; F25J 1/0271; F25J 2245/90; F25J 2290/62; F25J 2290/60; F25J 1/001; F17C 13/04; F17C 13/002; F17C 2221/012; F17C 2223/0123; F17C 2225/0153; F17C 2227/043; F17C 2250/0434; F17C 2270/0171; F17C 2201/0109; F17C 2201/035; F17C 2201/054; F17C 2203/0391; F17C 2203/0629; F17C 2205/0142; F17C 2223/033; F17C 2225/0161;
(Continued)

(56) References Cited

U.S. PATENT DOCUMENTS 7,284,575 B2 * 10/2007 Gram ........................ F04B 5/02
                                                         141/100
8,291,944 B2 * 10/2012 Allidieres ................. F17C 9/00
                                                          141/60

(Continued)

FOREIGN PATENT DOCUMENTS

DE  10 2010 047300   4/2012
FR       3061533    7/2018

OTHER PUBLICATIONS

French Search Report and Written Opinion for FR 1860429, dated Jul. 2, 2019.

*Primary Examiner* — Timothy P. Kelly
*Assistant Examiner* — Stephanie A Shrieves
(74) *Attorney, Agent, or Firm* — Christopher J. Cronin (57) ABSTRACT

Installation and method for storing and dispensing liquefied hydrogen involving a source of gaseous hydrogen, a liquefier, and two storage reservoirs for liquid hydrogen at determined respective storage pressures, wherein the liquefier includes an inlet connected to the source and an outlet connected in parallel, via a set of valves, to a respective inlet of each storage reservoir.

14 Claims, 4 Drawing Sheets

(52) U.S. Cl.
CPC ............... *F17C 2223/0123* (2013.01); *F17C 2225/0153* (2013.01); *F17C 2227/043* (2013.01); *F17C 2250/0434* (2013.01); *F17C 2270/0171* (2013.01)

(58) Field of Classification Search
CPC ........ F17C 2225/033; F17C 2227/0107; F17C 2227/04; F17C 2265/033; F17C 2265/037; F17C 2265/061; F17C 2270/0139; F17C 6/00; F17C 5/06; F17C 5/04; F17C 7/02; F17C 2223/013; F17C 2225/013; F17C 2225/0123; F17C 2227/041; F17C 2227/046; F17C 2265/032
USPC ........................................................ 137/111
See application file for complete search history.

(56) References Cited

U.S. PATENT DOCUMENTS

| | | | |
|---|---|---|---|
| 9,291,309 B2* | 3/2016 | Gupta | F17C 7/04 |
| 2003/0021743 A1* | 1/2003 | Wikstrom | F17C 5/06 |
| | | | 422/198 |
| 2005/0210914 A1* | 9/2005 | Allam | F25J 1/0065 |
| | | | 62/607 |
| 2008/0178612 A1 | 7/2008 | Utata | |
| 2008/0216913 A1* | 9/2008 | Kederer | F17C 5/007 |
| | | | 141/2 |
| 2015/0068222 A1* | 3/2015 | Hakamada | F25J 1/005 |
| | | | 62/48.2 |

* cited by examiner

METHOD AND INSTALLATION FOR STORING AND DISPENSING LIQUEFIED HYDROGEN

CROSS-REFERENCE TO RELATED APPLICATIONS

This application claims the benefit of priority under 35 U.S.C. § 119 (a) and (b) to French patent application No. FR 1860429, filed Nov. 12, 2018, the entire contents of which are incorporated herein by reference.

BACKGROUND

Field of the Invention

The invention relates to a method and an installation for storing and dispensing liquefied hydrogen.

The invention relates more particularly to an installation for storing and dispensing liquefied hydrogen, comprising a source of gaseous hydrogen and a liquefier.

Related Art

Notably on account of its density, liquid hydrogen is given preference over gaseous hydrogen when large amounts of product have to be transported over large distances.

Another advantage of liquid hydrogen is related to its density and the high capacity for storage in a hydrogen service station for fuel cell vehicles. A temperature of 20K in fact eliminates all the impurities (which at this temperature are solid) of the gas, thereby optimizing the operation of the fuel cells.

By contrast, because of the low density of the liquid hydrogen (70 g/litre) in comparison with water, the amount of pressure available through hydrostatic head and the low temperature may give rise to fairly significant evaporation losses during transfers of the liquid.

Specifically, the systems for loading lorries and filling tanks in hydrogen liquefaction factories can result in losses which can range up to 15% of production (for example 0.2% loss from the tank, 5% loss by flash vaporization in the valve for filling the tank and 10% loss in the processes used for filling the lorries). These losses may also arise when filling containers (notably iso containers), tanks on board ships or the like (other applications to which the invention may equally be applied).

These evaporation losses can, of course, be recovered, reheated, compressed after storage and reinjected into the liquefier. The hydrogen is produced from a source of gaseous hydrogen which is liquefied in a liquefier before being transferred to the storage reservoir. The boil-off gas can be drawn from a unit comprising, for example, in series, a heater, a buffer tank (for example isobaric) and a compression member. The gas recovered and compressed can be admitted to the inlet of the liquefier so that it can be re-liquefied and reintroduced into the storage reservoir.

The tanks of lorries arriving for filling are generally at a high temperature and at a high pressure. Some of this hot gas under pressure may be discharged to the liquid storage reservoir which is used for the filling. However, part of the depressurization of the tank cannot be vented to the liquid storage reservoir because the pressure at the lorry may drop below that of the storage reservoir. The excess pressurized hydrogen is therefore lost or sent to a recovery system.

The liquid storage reservoirs need to be able to continue to supply liquid hydrogen to the users when the liquefier or the hydrogen source that supplies it is shut down.

In addition, the cold present in the storage reservoirs is unable to compensate for all of the added heat introduced by the tank filling operations. That may generate an increase in the pressure in the storage reservoirs and a loss of hydrogen.

These solutions therefore generate losses of product (discharges into the air) or entail engineering the liquefier and the gas recovery unit to be able to absorb the boil-off gases produced when filling lorries.

SUMMARY OF THE INVENTION

It is an object of the present invention to alleviate all or some of the above-mentioned disadvantages of the prior art.

To this end, the installation according to the invention, in other respects in accordance with the generic definition thereof given in the above preamble, is essentially characterized in that it comprises two storage reservoirs for liquid hydrogen at determined respective storage pressures, the liquefier comprising an inlet connected to the source and an outlet connected in parallel, via a set of valves, to a respective inlet of each storage reservoir, the outlet of the liquefier also being connected to a connection end intended to be connected removably to a tank that is to be filled, each storage reservoir comprising a respective liquid withdrawing pipe comprising an end connected to the storage reservoir and at least one other end intended to be connected to at least one tank that is to be filled, each storage reservoir further comprising a respective gas withdrawing pipe comprising an end connected to the storage reservoir and another end connected to an inlet of the liquefier via a set of valves which is configured to allow gas to be recirculated to the liquefier so that it can be liquefied.

According to possible particular features:
- the two liquid-hydrogen storage reservoirs are kept at distinct determined respective storage pressures,
- the installation comprises a second liquefier comprising an inlet connected to the source and an outlet connected in parallel, via a set of valves, to a respective inlet of each storage reservoir.

The invention also relates to a method for filling a liquid hydrogen tank, notably a mobile tank of a semitrailer, using an installation according to any one of the features listed above or below and comprising a preliminary step of depressurizing the tank that is to be filled to a pressure below the pressure of that one of the two storage reservoirs that is at the higher of the two pressures.

The invention makes it possible to differentiate between the pressures of the two storage reservoirs. That makes it possible to use the difference in pressure from one storage reservoir to the other as a driving force to move the hydrogen so as to transfer fluid to the liquefier and supply enough cold for these tank-filling operations, while losing less hydrogen.

Moreover, embodiments of the invention may comprise one or more of the following features:
- the preliminary depressurization step comprises a transfer of a first quantity of liquid hydrogen into the tank directly from the liquefier,
- the preliminary depressurization step comprises a transfer of pressurized gas from the tank to one inlet of the liquefier and/or to one inlet of at least one of the storage reservoirs, the method comprises, simultaneously with the preliminary depressurization step, a step of transferring liquid hydrogen into at least one of the storage reservoirs from the liquefier, the method comprises a first filling step involving transferring liquid hydrogen, using the pressure differential, to the tank from that one of the two storage reservoirs that is at the higher of the two pressures, the method comprises, simultaneously with the first filling step, a step of transferring gaseous hydrogen from the tank to an inlet of the liquefier and liquefying it, the method comprises, simultaneously with the first filling step, a step of transferring liquid hydrogen from the liquefier to that one of the two storage reservoirs that is at the lower of the two pressures, the method comprises, after the first filling step, a step of depressurizing the tank to the pressure of that one of the two storage reservoirs that is at the lower of the two pressures, the depressurization step involving an equalizing of pressures between the tank and the said one of the two storage reservoirs that is at the lower of the two pressures, the method comprises, simultaneously with the step of depressurizing the tank to the pressure of that one of the two storage reservoirs that is at the lower of the two pressures, a step of transferring liquid hydrogen from the liquefier to the said one of the two storage reservoirs that is at the lower of the two pressures, the method comprises, after the step of depressurizing the tank to the pressure of that one of the two storage reservoirs that is at the lower of the two pressures, a step of further depressurizing the tank to a pressure below the pressure of that one of the two storage reservoirs that is at the lower of the two pressures, the further depressurization step comprising a transfer of gas from the tank to an inlet of the liquefier and/or a discharging of gas to the atmosphere and/or a gas collection member, the method employs two distinct liquefiers, a first liquid-hydrogen storage reservoir is kept at a first pressure comprised between 1.5 and 11 bar absolute, and notably between 2 and 3 bar absolute, preferably 2.5 bar absolute, a second liquid-hydrogen storage reservoir is kept at a second pressure comprised between 0.8 and 2.3 bar absolute, and notably between 1 and 2 bar absolute, preferably 1.5 bar absolute, before the step of transferring a first quantity of liquid hydrogen to the tank, the said tank is at a pressure above or equal to the pressure of that one of the two storage reservoirs that is at the higher of the two pressures, notably the tank is at a pressure of 3 to 11 bar, notably 8 bar, and at the end of the step of transferring a first quantity of liquid hydrogen to the tank, the pressure in the tank has dropped to a pressure below the pressure of that one of the two storage reservoirs that is at the higher of the two pressures, notably a few millibar below this pressure.

BRIEF DESCRIPTION OF THE FIGURES

Other particular features and advantages will become apparent from reading the following description, given with reference to the figures, in which.

DETAILED DESCRIPTION OF THE INVENTION

Figure 1:
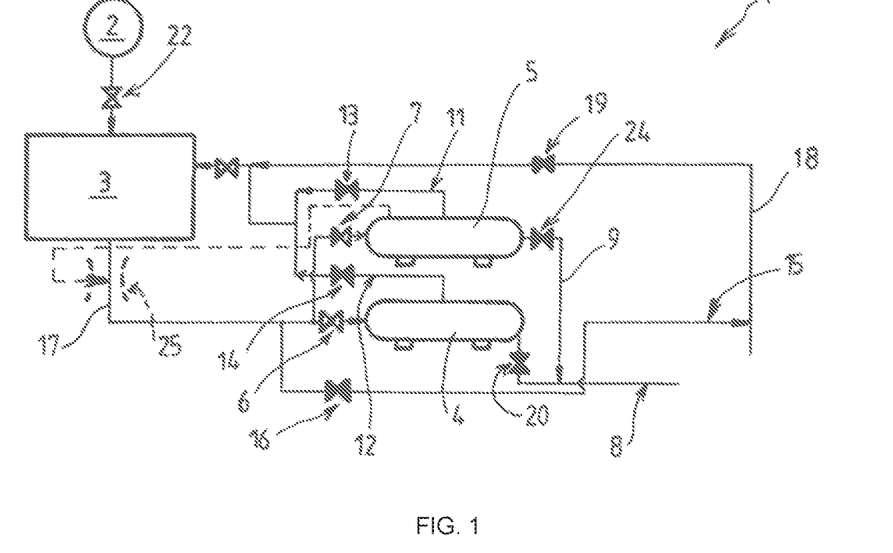
FIG. 1 is a schematic and partial view of the structure and operation of an installation according to one possible exemplary embodiment of the invention.
Figure 2:
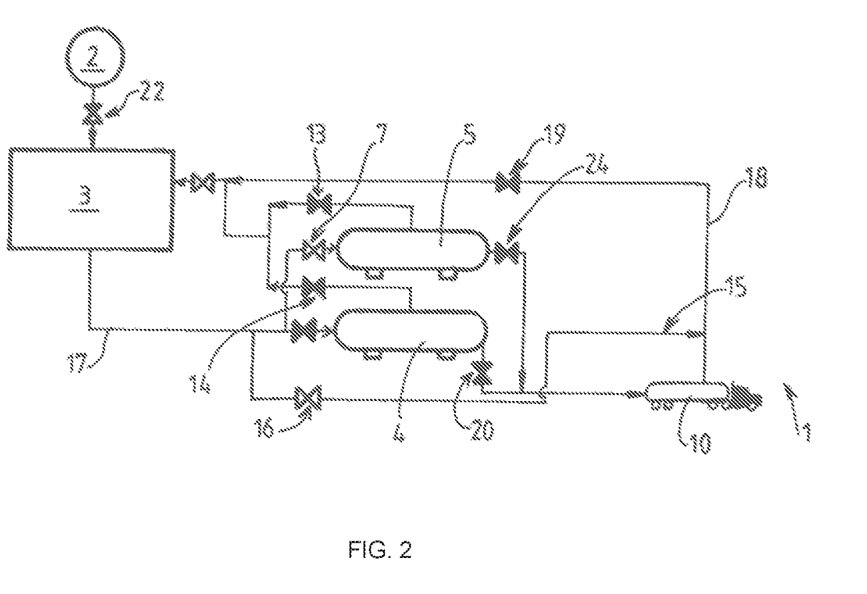
FIG. 2 is a schematic and partial view of a possible step in the operation of the installation of FIG. 1 during the filling of a tank.

The liquefied-hydrogen storage and distribution installation depicted in FIG. 1 comprises a source 2 of gaseous hydrogen, a liquefier 3 and two liquid-hydrogen storage reservoirs 4, 5.

The liquefier 3 comprises an inlet connected to the source 2 (for example via at least one valve 22).

The source 2 may be a hydrogen network and/or a unit for the production of hydrogen (for example steam reforming and/or by electrolysis or any other appropriate source). The gaseous hydrogen supplied by the source may have a pressure comprised for example between 10 and 80 bar.

The liquefier 3 comprises an outlet connected in parallel, via a set of valves 7, 6, 16, to respective inlets of the two storage reservoirs 5, 4 and also connected, at a removable-connection third end 15, to a tank 10 that is to be filled (for direct transfer from the liquefier 3 to the tank 10).

The liquid-hydrogen storage reservoirs 4, 5 are configured to store the liquid at determined respective pressures.

These storage reservoirs 4, 5 are, for example, insulated vacuum storage reservoirs of high-capacity, for example several thousand litres. These storage reservoirs 4, 5 conventionally contain the liquid phase with a vapour phase.

Conventionally, the storage pressure therein is preferably regulated, for example to a fixed value (for example between 1.05 and 11 bar, for example between 1.1 and 1.8 bar, notably 1.5 bar absolute, in the case of one 5 of the storage reservoirs and, for example, between 1.9 and 3 bar, notably 2.5 bar for the other 4 storage reservoir.

What is meant by the "pressure in the storage reservoir" is, for example, the mean pressure in the storage reservoir or in the bottom part of the storage reservoir or in the upper part (in the gas headspace). This is because, as a result of the low density of hydrogen, the pressure in the lower part of the storage reservoir is substantially equal to the pressure in the upper part.

The hydrogen supplied by the source 2 and liquefied by the liquefier 3 can be transferred to the storage reservoirs 4, 5 intermittently and/or continuously and/or in the event of the liquid level in the tanks 4, 5 dropping below a determined threshold. For preference, the liquid level in the storage reservoirs 4, 5 is automatically controlled by resupply from the liquefier 3 (output of the liquefier 3 and/or regulating valve regulating the rate of flow of liquid supplied to the storage reservoirs 4, 5).

Each storage reservoir 5, 4 comprises a respective liquid withdrawing pipe 9, 8 having one end connected to the storage reservoir 4, 5 (generally in the lower part) and at least one other end intended to be connected to at least one tank 10 that is to be filled.

Each storage reservoir 4, 5 further comprises a respective gas withdrawing pipe 12, 11 having one end connected to the storage reservoir 4, 5 (generally in the upper part) and another end connected to an inlet of the liquefier 3 via a set of valves 14, 13 which is configured to allow gas that is vaporized in one or both of the storage reservoirs 4, 5 to be recirculated to the liquefier 3 so that it can be liquefied.

As described in greater detail in the examples which follow, that one, 4, of the storage reservoirs 4, 5 that is at the higher pressure can be used to transfer the liquid hydrogen to the tank 10 that is to be filled, while that one, 5, of the storage reservoirs that is at the lower pressure can be used to recover the gaseous hydrogen coming from the tank 10 which has been cooled and liquefied (in the liquefier 3).

In a first configuration (cf. FIG. 1), the gaseous hydrogen supplied by the source 2 and liquefied by the liquefier 3 can be distributed to the storage reservoir 4 and/or the storage reservoir 5 for example via a pipe 17 having two downstream ends connected in parallel to the two storage reservoirs 4, 5 respectively (corresponding open valves 7, 6 depicted in white).

The pressure in a first storage reservoir 4 is higher than the pressure in the second storage reservoir 5.

The outlet valves 13, 14 that allow gas to be discharged via the gas withdrawing pipes 12, 11 are closed (closed valves depicted in black)

Likewise, the outlet valves 20, 24 that allow liquid to be discharged via the liquid withdrawing pipes 8, 9 are closed (closed valves depicted in black)

The hydrogen leaving the liquefier 3 is supercooled in order to maintain the pressure of the storage reservoirs and guard against the ingress of heat. What that means to say is that the liquefier 3 can be configured to produce a supercooled liquid, which means to say a liquid at a temperature below the bubble temperature for hydrogen at the pressure of the storage reservoir concerned.

Alternatively or in combination, an ejector 25 could be provided in or at the outlet of the liquefier 3, the pressurized gas withdrawn from the second storage reservoir 5 would be used in the ejector 25 and mixed with the liquid transferred to the first storage reservoir 4 (cf. schematic depiction in dotted line in FIG. 1). This makes it possible to maintain the pressure of the second storage reservoir 5 and reduce the level of supercooling for the first storage reservoir 4.

When a lorry arrives at the installation 1 to fill its liquid tank 10, this tank is generally partially empty and at a relatively high temperature and a relatively high pressure (for example a pressure from 2 to 10 bar and a temperature of 100 to 25K for example).

Once the tank 10 has been connected to the installation 1 (to the liquid supply pipes 8, 15 and to a gas return pipe 18 of the installation), the pressure in the tank 10 needs to be reduced to below the pressure of the first storage reservoir 4 so as to allow the tank 10 to fill by the equalizing of pressures from this first storage reservoir 4.

The hydrogen present in the tank 10 that is to be filled is generally predominantly gaseous (from 1 to 10% liquid phase for example) and is a temperature between 100K and 25K.

This drop in pressure can be achieved by transferring supercooled liquid hydrogen into the tank 10 directly from the liquefier 3 via the end 15 of the transfer pipe, the valve 16 of which is therefore open.

This inrush of (preferably supercooled) liquid hydrogen into the tank 10 will lower the pressure therein by cooling and condensing the hydrogen present, even if the discharge for discharging gas from the reservoir is closed (valve 19 onto the gas return pipe 18 closed, cf. FIG. 1).

It is possible to transfer (force) liquid hydrogen into the tank 10 because the supply pressure of the source 2 is preferably higher than the pressure prevailing in the tank 10 that is to be filled.

The more supercooled the hydrogen leaving the liquefier 3 (for example at a temperature of 21K to 15K), the more rapid this depressurization of the tank 10 will be. The liquefaction output which is not transferred to the tank 10 (which means to say the portion of the liquid supplied "in excess" by the liquefier 3) can be used to fill the second storage reservoir 5 (cf. corresponding valve 7 open as before).

Figure 3:
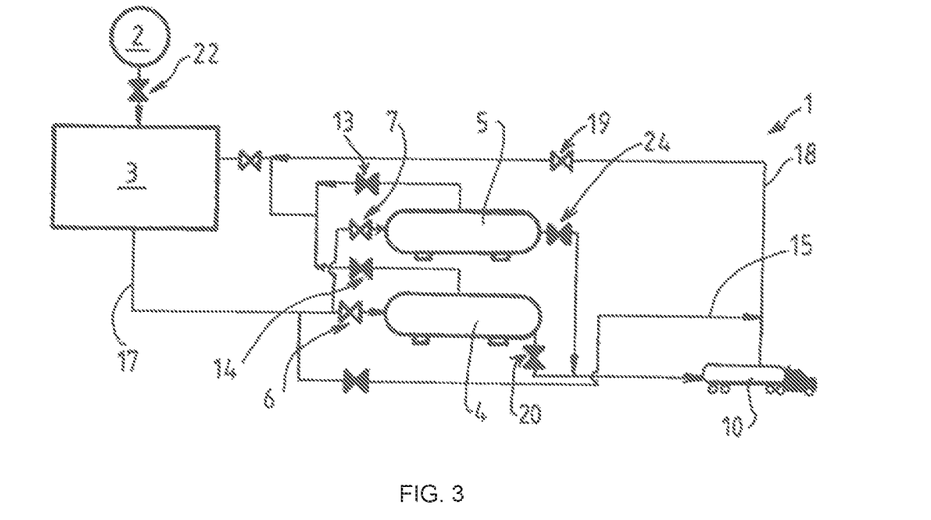
FIG. 3 is a schematic and partial view of another possible step in the operation of the installation of FIG. 1 during the filling of a tank.

Alternatively or in combination, the preliminary step of depressurizing the tank 10 may comprise a transfer of pressurized gas from the tank 10 to an inlet of the liquefier 3 (cf. FIG. 3 by opening the valve 19 on the gas return pipe 18). At the same time, the liquefier 3 may supply liquid to the first storage reservoir 4 and/or the second storage reservoir 5 (cf. FIG. 3, valves 6, 7 open).

Figure 4:
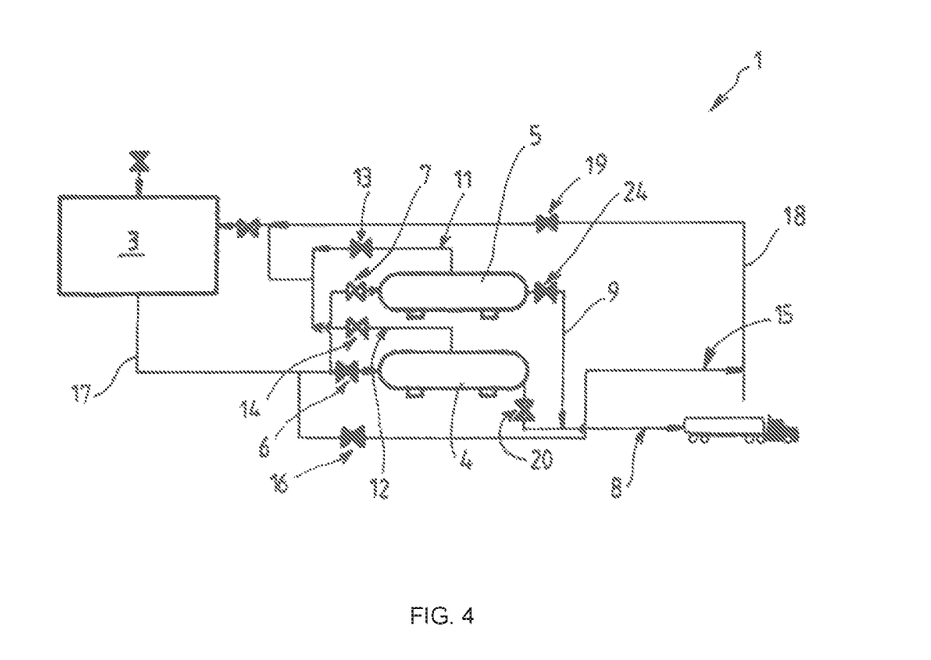
FIG. 4 is a schematic and partial view of another possible step in the operation of the installation of FIG. 1 during the filling of a tank.

Alternatively or in combination, the preliminary step of depressurizing the tank 10 may comprise a transfer of pressurized gas from the tank 10 to an inlet of the first storage reservoir 4 (cf. FIG. 4, by opening the valve 20 on the liquid supply pipe 8). At the same time, the valve 6 situated between the outlet of the liquefier 3 and the inlet of the first storage reservoir 4 is closed, while the valve 14 situated between a gas outlet of the first storage reservoir 4 and an inlet of the liquefier 3 is open. In addition, the liquid supplied by the liquefier 3 can be used to fill the second storage reservoir 5 (cf. corresponding valve 7 open as before).

When the tank 10 has reached a pressure below the pressure of the first storage reservoir 4, the liquid level in the tank 10 generally lies at between 10% and 50% of its maximum capacity (this can vary according to the initial conditions in the tank 10).

In one possible sequence, there may first of all be (supercooled) filling of the tank 10 from the liquefier 3 (in order to begin to cause the pressure to drop and to cool the vapours in the tank 10), followed by depressurization of the tank 10 towards an inlet of the liquefier 3 with liquid being sent back from the liquefier 3 towards the storage reservoir 4 and/or the storage reservoir 5 until the tank 10 reaches a first pressure P1 higher than the pressure in that storage reservoir 4 that has the highest pressure.

A depressurization of the tank 10 may then be performed towards the liquefier 3 with liquid being sent from the liquefier 3 to the storage reservoir 5 that is at the lowest pressure, until the tank 10 reaches a pressure P2 comprised between the pressures of the two storage reservoirs 4 and 5.

At the end of this depressurization, the liquid level in the tank 10 likewise lies between 10 and 50% of its maximum capacity.

The main phase of the filling of the tank 10 can then take place.

Figure 5:
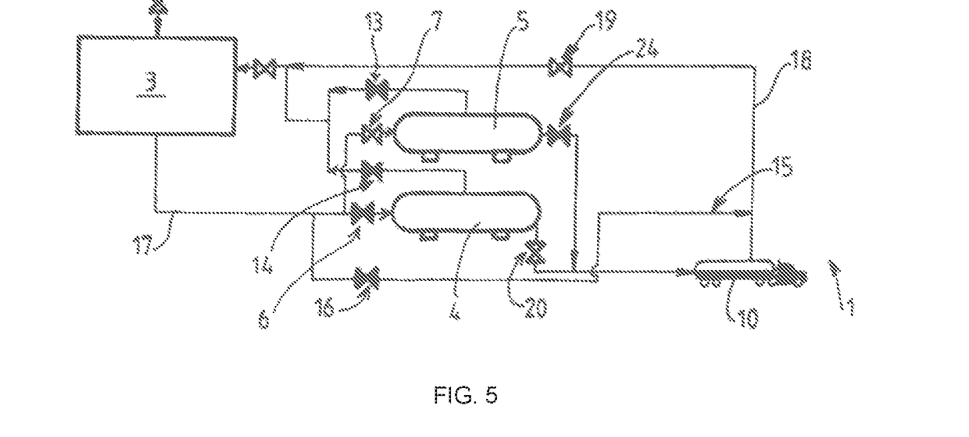
FIG. 5 is a schematic and partial view of another possible step in the operation of the installation of FIG. 1 during the filling of a tank.

As illustrated in FIG. 5, liquid hydrogen may then be transferred from the first storage reservoir 4 to the tank 10 by the liquid withdrawing pipe 8 that connects them (with the corresponding valve 20 open) by means of the pressure differential (the other valves 14, 6 providing access to the first storage reservoir 4 are closed).

Any vapours leaving the tank 10 (for example at a temperature of between 100K and 23K) may potentially be recovered by the gas return pipe 18 (notably with the valve 19 open) connecting the tank 10 to the inlet of the liquefier 3.

This hot gas is thus liquefied and the liquid obtained can be transferred to the second storage reservoir 5 via the pipe with the corresponding valve 7 open.

It is also possible to continue to liquefy hydrogen supplied by the source 2. In that case, the liquid will preferably be produced/expanded in the liquefier 3 at/to a pressure somewhere between the pressure of the tank 10 and the pressure of the second storage reservoir 5, in order to allow it to be transferred to the second storage reservoir 5 using the pressure differential (via the transfer pipe 17 and the opening of the corresponding valve 7).

As before (cf. FIG. 1), as an alternative it is possible to provide an ejector at the outlet of the liquefier 3 which is supplied this time with the pressurized gas coming from the tank 10 so as to reduce the pressure in the tank 10 more rapidly and accelerate its filling with liquid.

When the desired quantity of liquid has been transferred to the tank (tank 10 having reached its determined fill threshold), the tank 10 can then be depressurized to the pressure of the second storage reservoir 5 (or lower).

After the above filling, the pressure in the tank 10 is generally close to the pressure in the first storage reservoir 4. The fill level of the tank 10 is for example between 50% and 95%. Its pressure does, however, need to be reduced so that it can rejoin the road and not lose hydrogen on the way.

This road-legal pressure varies according to local regulations.

Figure 6:
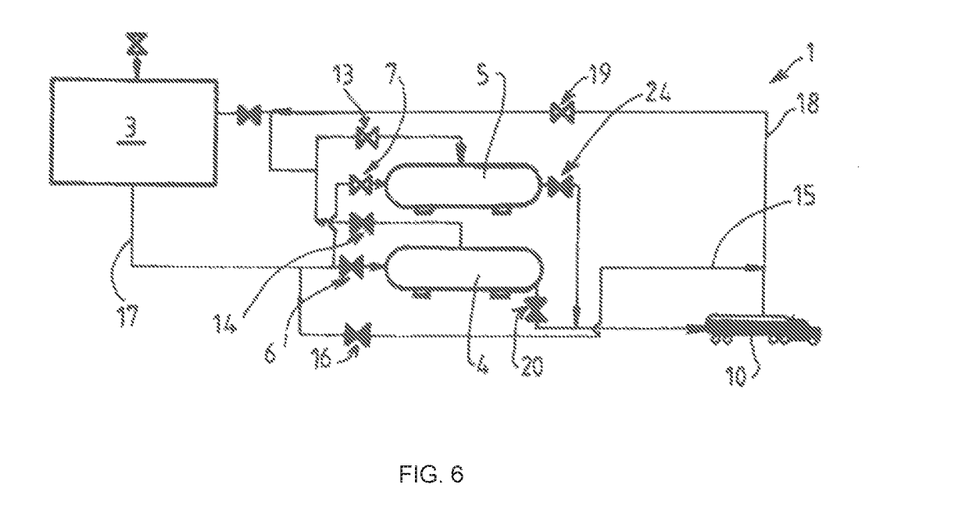
FIG. 6 is a schematic and partial view of another possible step in the operation of the installation of FIG. 1 during the filling of a tank.

Connecting the tank 10 (the vapour outlet thereof) to the second storage reservoir 5 via the gas return pipe is 18 and the gas withdrawing pipe 11 (with the corresponding valves 19 and 13 open) allows vapour to be discharged from the tank 10 to the second storage reservoir 5. This allows the pressures of the tank 10 and of the second storage reservoir 5 to equalize to a pressure close to the pressure of the second storage reservoir 5 (the pressures are close rather than equal because supercooled liquid arrives in the second storage reservoir 5 from the liquefier 3 and because of the difference in size between the tank 10 and the storage reservoir 5).

As an alternative or in combination, it is also possible to return the vapours from the lorry tank 10 to the liquefier 3 via an ejector at the source 2 and extracting the gas during expansion of the gas in the liquefier 3.

After this depressurization, the tank 10 is at a pressure close to the pressure in the second storage reservoir 5.

If this pressure is compatible with the required road-legal pressure, the lorry can disconnect from the installation 1 and depart, to transport the liquid hydrogen to its destination. The system returns to the starting first configuration.

Figure 7:
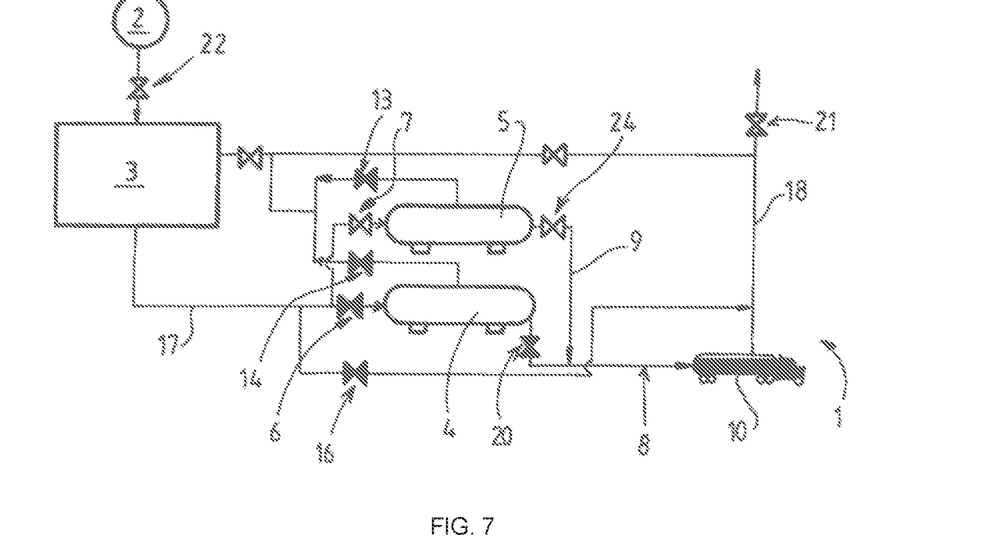
FIG. 7 is a schematic and partial view of another possible step in the operation of the installation of FIG. 1 during the filling of a tank.

If, on the other hand, the pressure in the tank 10 is still too high (with respect to regulatory requirements) to take to the road, further depressurization is possible, for example to a vent (cf. reference 21, FIG. 7) and/or to a hydrogen recovery system.

Otherwise, the end of filling may also be achieved via the second storage reservoir 5 using the corresponding pipe 9. The pressure in the tank 10 is then reduced via the recovery of vapour to the liquefier (via the gas return pipe 18 and its valve 19, which is open (and/or via an ejector withdrawing the vapours from the storage reservoir towards the source 2).

If the source 2 is not available (for example if a valve 22 situated between the source 2 and the liquefier 3 is closed).

In this case, when there is no tank 10 to be filled (according to the configuration of FIG. 1) but the pressures of the two storage reservoirs 4, 5 need to be maintained in case of the arrival of a tank 10 that is to be filled.

In this case, the liquefier 3 may use its liquefaction refrigeration capacity to condense and/or to supercool the vapours of the storage reservoirs 4, 5.

Thus, for example, when the pressure in the first storage reservoir 4 rises (because of the ingress of heat which evaporates some of the liquid), the gas produced can be transferred to the liquefier 3 via the gas withdrawal pipe 12 (with the corresponding valve(s) 14 open). The liquefied and supercooled gas can then be transferred to the second storage reservoir 5 at a lower pressure (via the pipe 17 and the corresponding valve 7).

Supercooling the hydrogen (for example down to 15K) makes it possible to avoid a pressure rise in this second storage reservoir 5 despite the ingress of heat.

When the source 2 is not available (valve 22 closed for example) and a reservoir 10 is connected to the installation and needs to be depressurized, the pressure in the tank 10 can be dropped below the pressure in the first storage reservoir 4 in order to allow it to fill from this storage reservoir 4.

The hydrogen present in the tank 10 that is to be filled is predominantly gaseous (from 1 to 10% liquid phase for example) and is at a temperature between 100K and 25K, for example. By connecting the gas outlet of the tank 10 to the liquefier 3 (gas return pipe 18 via the open valve 19), this allows the gaseous hydrogen coming from the tank 10 to be liquefied. This liquefied hydrogen can be transferred into the first storage reservoir 4 and/or the second storage reservoir 5 according to the pressure in the tank 10. At the end of this step, the tank 10 is at a pressure below the pressure of the first storage reservoir 4 allowing it to fill from this storage reservoir 4 as described earlier.

In one possible alternative form of embodiment, the installation comprises more than two storage reservoirs which may have distinct determined respective storage reservoir pressures.

Figure 8:
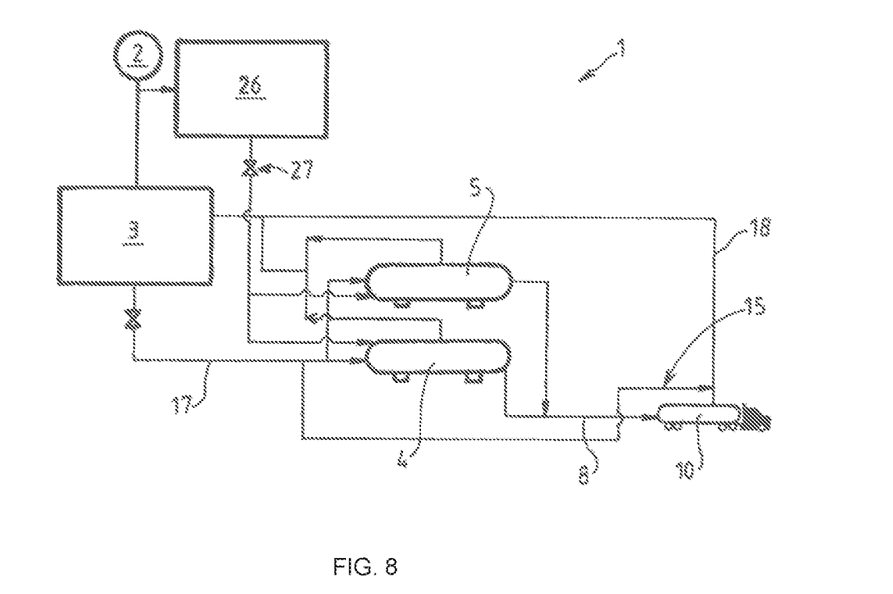
FIG. 8 is a schematic and partial view of the structure and operation of an installation according to another possible exemplary embodiment of the invention.

In an alternative form of embodiment depicted in FIG. 8, the installation 1 may comprise two liquefiers 3, 26. FIG. 8 has been simplified by comparison with the preceding figures (same architecture, but not all of the earlier valves have been depicted in FIG. 8).

This alternative form is advantageous notably when there are large variations in the demand for hydrogen where for flexibility of having one liquefier may become penalizing.

In particular, the second liquefier 26 (or the liquefier that is additional in comparison with the above solution) is also supplied from the source 2. In addition, this additional liquefier 26 may also have a liquid outlet connected to each of the two storage reservoirs 4, 5 (for example via a pipe comprising two downstream ends connected in parallel to two inlets of the storage reservoirs 4, 5, respectively).

For preference, the two liquefiers 3, 26 are of different sizes. In addition, as illustrated in FIG. 8, for preference just one (the first) liquefier 3 is configured to recover the vapours from the installation. The other, additional, liquefier produces liquid only from the gas supplied by the source 2.

This additional liquefier 26 will make it possible to take over control of the vapours from the storage reservoirs 4, 5 and from the tank 10. The cooling/filling steps may be similar to those described hereinabove with the difference that the additional liquefier 26 may supply liquid hydrogen also to the storage reservoir or reservoirs 4, 5 if need be.

Low-pressure hydrogen from the first liquefier 3 could potentially be sent on to the second liquefier 26 in order to recover the available frigories for liquefying the gas supplied by the source (or vapours at a higher pressure). Likewise, it may be conceivable to provide the option for the second liquefier 26 to recover warmed vapours with a view to liquefying them.

Thus, all or part of the above-mentioned processes which are performed by a single liquefier 3 may be performed by one of the two or by both liquefiers 3, 26.

In addition, the system can be configured to fill several tanks 10. In that case, it is possible to provide as many ends and valves 20, 24, 16, 19 as there are tanks to be filled (notably simultaneously).

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. An installation for storing and dispensing liquefied hydrogen, comprising: a source of gaseous hydrogen, a liquefier, and two storage reservoirs for liquid hydrogen at determined respective storage pressures, the liquefier comprising an inlet connected to the source and an outlet connected in parallel, via a set of valves, to a respective inlet of each storage reservoir, the outlet of the liquefier also being connected to a connection end that is adapted and configured to be removably connected to a tank that is to be filled, each storage reservoir comprising a respective liquid withdrawing pipe comprising an end connected to the storage reservoir and at least one other end intended to be connected to the tank that is to be filled, each storage reservoir further comprising a respective gas withdrawing pipe comprising an end connected to the storage reservoir and another end connected to an inlet of the liquefier via a set of valves which is configured to allow gas to be recirculated to the liquefier so that it can be liquefied.

2. The installation of claim 1, wherein the two liquid-hydrogen storage reservoirs are kept at distinct determined respective storage pressures.

3. The installation of claim 1, wherein further comprising a second liquefier comprising an inlet connected to the source and an outlet connected in parallel, via a set of valves, to a respective inlet of each storage reservoir.

4. A method for filling a liquid hydrogen tank using the installation of claim 1, comprising a first step of depressurizing the tank that is to be filled to a pressure below a pressure of one of the two storage reservoirs that has a pressure higher than the other of the two storage reservoirs.

5. The method of claim 4, wherein the first depressurization step comprises a transfer of a first quantity of liquid hydrogen into the tank directly from the liquefier.

6. The method of claim 4, wherein the first depressurization step comprises a transfer of pressurized gas from the tank to one inlet of the liquefier and/or to one inlet of at least one of the storage reservoirs.

7. The method of claim 4, further comprising, simultaneously with the first depressurization step, a step of transferring liquid hydrogen into at least one of the storage reservoirs from the liquefier.

8. The method of claim 4, further comprising a step of filling the tank that is to be filled by transferring liquid hydrogen, using a pressure differential, to the tank from the higher pressure storage reservoir.

9. The method of claim 8, further comprising, after the filling step, a second step of depressurizing the tank to the pressure of the lower pressure storage reservoir, the second depressurization step involving an equalizing of pressures between the tank and the lower pressure storage reservoir.

10. The method of claim 9, further comprising, simultaneously with the second depressurization step, a step of transferring liquid hydrogen from the liquefier to the lower pressure storage reservoir.

11. The method of claim 10, further comprising, after the second depressurization step, a step of further depressurizing the tank to a pressure below the pressure of the lower pressure storage reservoir, the further depressurization step comprising a transfer of gas from the tank to an inlet of the liquefier and/or a discharging of gas to the atmosphere and/or a gas collection member.

12. The method of claim 8, further comprising, simultaneously with the filling step, a step of transferring gaseous hydrogen from the tank to an inlet of the liquefier where the transferred gaseous hydrogen is liquefied.

13. The method of claim 8, further comprising, simultaneously with the filling step, a step of transferring liquid hydrogen from the liquefier to the lower pressure storage reservoir.

14. The method of claim 4, wherein the liquid hydrogen tank is a mobile tank of a semitrailer.

* * * * *